United States Patent [19]

Dueber et al.

[11] Patent Number: 5,177,118
[45] Date of Patent: Jan. 5, 1993

[54] MANUFACTURE OF FIRE RETARDANT FOAMS

[75] Inventors: Ernst O. Dueber, Tervuren; Louis Muller, Ottenburg, both of Belgium

[73] Assignee: Imperial Chemical Industries PLC, London, England

[21] Appl. No.: 594,261

[22] Filed: Oct. 9, 1990

[30] Foreign Application Priority Data

Oct. 11, 1989 [GB] United Kingdom ............... 8922930

[51] Int. Cl.⁵ .............................................. C08G 18/00
[52] U.S. Cl. ...................................... 521/159; 521/54; 521/109.1; 528/66; 528/67; 428/247
[58] Field of Search ...................... 521/159, 54, 109.1; 528/66, 67; 428/247

[56] References Cited

U.S. PATENT DOCUMENTS

| | | | |
|---|---|---|---|
| 3,726,835 | 4/1973 | Bertozzi et al. | 528/61 |
| 4,093,759 | 6/1978 | Otsuki et al. | 428/35 |
| 4,365,025 | 12/1982 | Murch et al. | 521/159 |
| 4,910,231 | 3/1990 | Pham et al. | 521/159 |

FOREIGN PATENT DOCUMENTS 2163762  3/1986  United Kingdom .

Primary Examiner—Morton Foelak
Assistant Examiner—Duc Truong

[57] ABSTRACT

The invention provides a process for the manufacture of polymeric foams by reacting at least one isocyanate-containing component and water, in which process the isocyanate-containing component comprises a dispersion of a solid fire retardant additive in a liquid isocyanate prepolymer having a free NCO content between 2 and 15% by weight.

The invention also provides new fire retardant compositions comprising a dispersion of a solid fire retardant in liquid isocyanate-containing prepolymer compositions based on a diphenylmethane diisocyanate component and a polyol component.

14 Claims, No Drawings

MANUFACTURE OF FIRE RETARDANT FOAMS

This invention relates to the use of fire retardant compositions in the production of foams and more particularly to the use of dispersions of solid fire retardant additives in the production of fire retardant polymeric foams.

The production of useful polymeric materials by reacting organic polyisocyanates with isocyanate-reactive compounds such as polyols and polyamines is well known. The materials produced in this way include polyurethane foams which are widely used as insulation materials or cushioning and padding materials.

In order to reduce the flammability of polyurethane foams, it has been proposed to incorporate fire retardant additives in the foam formulation. Such additives may be liquids such as tris chloroethyl phosphate or solids such as melamine. The inclusion of melamine in foam formulations has been described in U.S. Pat. No. 4,258,141, in GB 1585750 and in GB 2163762, the melamine being introduced into the formulation as a mixture with the polyol component.

Drawbacks associated with these known approaches include sedimentation of the solid fire retardant and deactivation of the catalyst in the polyol component.

It has now been found that solid fire retardant additives may be conveniently incorporated into foam forming formulations as dispersions in a polyisocyanate prepolymer having a low —NCO content.

Accordingly, the invention provides a process for the manufacture of polymeric foam by reacting at least one isocyanate containing component and water, in which the isocyanate containing component comprises a dispersion of a solid fire retardant additive in a liquid isocyanate prepolymer having a free NCO-content between 2 and 15% by weight, said prepolymer being the reaction product of an excess amount of organic polyisocyanate and one or more compounds containing a plurality of isocyanate-reactive groups.

Solid fire retardant additives which may be present in the compositions of the invention include antimony compounds, for example antimony oxides and antimony trihalides, boron compounds, for example borax, boric acid, zinc borate and ammonium fluoroborate, alumina trihydrate, ammonium phosphate, ammonium molybdate, molybdenum oxides and, especially, cyanic acid derivatives such as cyanamide, dicyandiamide, guanidine, biguanidine, cyanuric acid and solid esters thereof and, particularly, melamine, ammonium polyphosphate or guanidine carbonate.

The isocyanate prepolymer compositions used in the invention may contain one or more fire retardant additives. Thus, if desired, the compositions can contain a mixture of a solid fire retardant additive and at least one other solid fire retardant additive and/or at least one liquid fire retardant additive.

Examples of liquid fire retardants which may optionally be present in the compositions of the invention include tris-2-chloroethyl phosphate, tris chloropropyl phosphate, tricresyl phosphate and tris-2,3-dibromopropyl phosphate.

The amount of solid fire retardant additive which may be present in the compositions for use in the invention should be appropriate to the fire retardant effect it is desired to achieve in the ultimate polymer and this may be determined by trial. Typical compositions contain from about 10 to about 50, preferably 15 to 25% by weight of solid fire retardant based on the weight of polyisocyanate although compositions containing smaller or larger amounts can also be useful.

The particle size of the solid fire retardant additive may vary but melamine is preferably employed in a finely divided form, typically having an average particle size of not more than about 100 microns.

The prepolymers for use in the invention are obtained by reacting a compound containing a plurality of isocyanate-reactive groups with a stoichiometric excess of an organic polyisocyanate composition.

Liquid organic polyisocyanates which may be used particularly include diphenylmethane diisocyanate (MDI) compositions, especially compositions which are liquids at normal room temperatures. Suitable MDI compositions include liquid mixtures of MDI isomers, especially mixtures containing the 4,4'-isomer together with not more than 60% of the 2,4'-isomer and not more than 5% of the 2,2'-isomer, said components being expressed as weight percentages of the total composition.

Further diphenylmethane diisocyanate compositions on which the prepolymer compositions of the invention may be based include compositions containing polymethylene polyphenylene polyisocyanates. Thus, mixtures may be used containing at least 70% by weight of pure MDI (4,4'-isomer or isomer mixture) and up to 30% by weight of the so-called polymeric MDI containing from 25 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Also modified forms of MDI may be used, that is to say MDI modified in known manner by the introduction of, for example, urethane, allophanate, urea, biuret, carbodiimide, uretonimine or isocyanurate residues.

Still further diphenylmethane diisocyanate compositions which may be used in preparing the prepolymers include mixtures of the above described MDI isomers, isomer mixtures, modified MDI and the like and up to 20% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates.

Prepolymers on which the compositions of the invention may be based particularly include urethane prepolymers obtained by reacting an MDI composition with a polyol having an average nominal hydroxyl functionality of from 2 to 6 and an average hydroxyl equivalent weight of from about 500 to about 5000. The term "nominal hydroxyl functionality" used in relation to the polyol on which the prepolymer is based refers to the hydroxyl functionality that a polyol would be expected to have having regard to its monomeric components. For example, a polyether polyol prepared by the addition of propylene oxide to a glycol will have a nominal hydroxyl functionality of 2 although, in fact, its average functionality may be somewhat less than 2. Thus, for a polyether polyol, the average nominal hydroxyl functionality is the average functionality (number of active hydrogen atoms) of the initiator or initiators used in its preparation.

The average nominal hydroxyl functionality of the polyol is preferably 2 to 4 and more preferably 2 to 3. Preferred average equivalent weights lie in the range from 750 to 4000, for example from 1000 to 3000. Mixtures of two or more polyols varying in functionality, equivalent weight and/or polymer backbone may be used provided such mixtures conform to the average functionality and average equivalent weight criteria specified herein.

Suitable polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers. Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water, ammonia, polyols, for example ethylene glycol, propylene water, diethylene glycol, cyclohexane dimethanol, resorcinol, bisphenol A, glycerol, trimethylolpropane, 1,2,6-hexanetriol, triethanolamine, pentaerythritol or sorbitol, amines, for example aniline, ethylene diamine, tolylene diamine, diaminodiphenylmethane or polymethylene polyphenylene polyamines and amino-alcohols, for example ethanolamine or diethanolamine. Mixtures of initiators and/or cyclic oxides may be used.

Especially useful polyether polyols include polyoxypropylene diols and triols and poly(oxyethylene-oxypropylene) diols and triols obtained by the simultaneous of sequential addition of ethylene and propylene oxides to di- or trifunctional initiators as fully described in the prior art. Random copolymers having oxyethylene contents of 10-80%, block copolymers having oxyethylene contents of up to 24% and random/block copolymers having oxyethylene contents of up to 50%, based on the total weight of oxyalkylene units may be mentioned. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terphthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and poly(isobutylene) polyols. Suitable polysiloxane polyols include polydimethylsiloxane diols and triols.

The urethane prepolymers may be prepared in known manner by reacting the diphenylmethane diisocyanate composition with the polyol in relative proportions appropriate for the formation of a prepolymer of the desired NCO content. Typical reaction conditions include the use of ambient or elevated temperatures, for example temperatures of from about 40° C. to about 90° C., in the absence or presence of catalysts for urethane formation. If desired, the reaction may be continued under known conditions so as to convert a proportion of urethane to allophanate groups.

Other prepolymers on which the compositions of the invention may be based include urea prepolymers obtained by reacting an MDI composition with a polyamine having an average nominal primary and/or secondary amino functionality of from 2 to 6 and an average amino equivalent weight of from about 500 to about 5000.

Suitable polyamines and methods for their preparation have been fully described in the prior art and include polymeric polyamines, especially diamines and triamines, corresponding to the above described polyols. The polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred. Also useful are polymers containing both amino and hydroxyl groups obtained by the partial amination of polyols, and combinations of polyols and polyamines.

The urea prepolymers may be prepared in known manner by reacting the diphenylmethane diisocyanate composition with the polyamine in relative proportions appropriate for the formation of a prepolymer of the desired NCO content. If desired, the reaction may be continued under known conditions so as to convert a proportion of urea groups to biuret groups.

Preferred prepolymer compositions for use in the present invention are liquid isocyanate-containing prepolymer compositions having an average isocyanate functionality greater than 2 and an NCO content of from 2 to 15% by weight, preferably 2 to 12% by weight as obtainable by reacting an isocyanate reactive polymer having an average nominal functionality of from 2 to 6, preferably from 2 to 4, and an average equivalent weight of from about 500 to 5000 with a stoichiometric excess of a diphenylmethane diisocyanate composition containing at least 2% by weight of 2,4'-di-phenylmethane diisocyanate and having an average isocyanate functionality in the range from 2 to 2.3.

More narrowly preferred prepolymers are stable liquid isocyanate-containing polyurethane prepolymer compositions having an average isocyanate functionality greater than 2 and an NCO content of from 2 to 15% by weight obtained by reacting:

(i) a polyol component comprising at least one polyoxyalkylene polyol containing oxyethylene residues, said polyol component having an average nominal functionality of from 2 to 6, an average hydroxyl equivalent weight of from about 500 to about 5000 and an average oxyethylene content of from 5 to 30% on a weight basis of total oxyalkylene residues, preferably from 10 to 25%, and (ii) a stoichiometric excess, relative to the polyol component, of a diphenylmethane diisocyanate composition containing at least 2% by weight of 2,4'-diphenylmethane diisocyanate on a weight basis of diisocyanate components, and having an average isocyanate functionality in the range from 2 to 2.3.

Most specifically and even more preferred are stable liquid isocyanate-containing prepolymer compositions as obtainable by reacting an isocyanate-reactive polyoxyalkylene polymer with a diphenylmethane diisocyanate containing composition, characterised by an average isocyanate functionality of the prepolymer composition greater than 2, preferably in the range from 2.05 to 2.4;

an —NCO content of the prepolymer composition of from 2 to 12% by weight, preferably of from 5 to 12% by weight;

an oxyethylene content in the isocyanate-reactive polyoxyalkylene polymer in the range from 5 to 30% on a weight basis of total oxyalkylene residues;

an average nominal functionality of the isocyanate-reactive polyoxyalkylene polymer of from 2 to 6;

a total diphenylmethane diisocyanate content in the diphenylmethane diisocyanate—containing composition of at least 60% by weight;

a 2,4'-diphenylmethane diisocyanate isomer content in the diphenylmethane diisocyanate containing composition of at least 5%;

an average isocyanate functionality of the diphenylmethane diisocyanate—containing composition of from 2 to 2.3, preferably of from 2.1 to 2.3.

The preferred solid fire retardants for incorporation into any of the aforementioned diphenylmethane diisocyanate prepolymers are melamine, ammonium polyphosphate and guanidine carbonate.

The fire retardant compositions for use in the invention may be prepared in any convenient manner using conventional mixing means appropriate for dispersing a solid in a liquid. Thus, the solid fire retardant additive may be mixed into the liquid polyisocyanate prepolymer or any liquid precursor thereof.

The fire retardant additive may be incorporated directly into the prepolymer or into the MDI or the polyol or polyamine before prepolymer formation. Where the urethane (or urea) prepolymer is to be converted to an allophanate (or biuret) prepolymer, the additive may be incorporated at any of these stages or into the final prepolymer.

The prepolymer composition can be processed or stored at room temperature or at higher temperatures such as 40° C., 60° C. or even higher temperatures.

The fire retardant compositions of the invention contain free isocyanate groups and accordingly may be reacted, optionally in conjunction with other pure, crude or modified polyisocyanates, with water and optionally other isocyanate-reactive materials, using known techniques, to form fire resistant polyurethane, polyurea and other useful polymeric foams.

The invention is particularly suitable for the manufacture of fire resistant polyurethane foams. To effect foam formation, the fire retardant composition is reacted with water in the presence as necessary of other polyisocyanates, other isocyanate-reactive materials and conventional additives. Such additives include inert volatile blowing agents, for example low boiling halocarbons, catalysts, for example tertiary amines and tin compounds, surface-active agents and foam stabilisers, for example siloxane-oxyalkylene copolymers, chain extenders, for example low molecular weight diols, diamines and di-imines, crosslinking agents, for example triethanolamine, organic and inorganic fillers, pigments and internal mould release agents.

The invention is illustrated but not limited by the following examples.

EXAMPLE 1

Preparation of Prepolymer A

To 29.7 kg of methylene diphenyl diisocyanate having a 2,4' isomer content of 10%, was added 2.54 kg of isophorone diamine, at 45° C., under high shear mixing. The reaction mixture was heated to 85° C. and subsequently reacted with 67.8 kg of a polyether triol having an average Mw of 4675, while maintaining high shear mixing, during 90 min. The reaction mixture was finally cooled down to 40° C. The resulting Prepolymer A had an NCO content of 6.90% and a viscosity of 11 035 cPs at 25° C.

EXAMPLE 2

Preparation of Prepolymer B

Prepolymer B was obtained by reacting 25 kg of methylene diphenyl diisocyanate having a 2,4' isomer content of 10%, with 75 kg of a polyether triol of average mw 4675, at 85° C., with stirring. The reaction mixture was continuously stirred at 85° C., for 90 min and subsequently cooled down to 40° C. The resulting Prepolymer B had an NCO content of 6.55% and a viscosity of 6955 cPs at 25° C.

EXAMPLES 3-4

Melamine/Isocyanate Dispersions

Dispersion 1 was prepared by mixing under high shear 65 parts by wt of Prepolymer A and 15 parts by wt of "Suprasec" DNR (a polymeric MDI available from ICI) with 20 parts by wt of melamine powder.

Dispersion 2 was prepared in the same way starting from Prepolymer B.

The rate of sedimentation of melamine in the melamine/isocyanate prepolymer dispersions was slow.

EXAMPLE 5

Preparation of Flexible Foam

A flexible foam of good mechanical and fire resistance properties was prepared by reacting under conventional bench scale, free rise foaming conditions, 100 parts of dispersion 1 with 4.2 parts of a mixture of water and catalyst (in a ratio of 20:1 by weight).

We claim:

1. A process for the manufacture of polymeric foam by reacting at least one isocyanate-containing component and water, wherein the improvement is characterised in that the isocyanate containing component comprises a dispersion of a solid fire retardant additive in a liquid isocyanate prepolymer having a free-NCO content between 2 and 15% by weight, said prepolymer being the reaction product of an excess amount of organic polyisocyanate and one or more compounds containing a plurality of isocyanate-reactive groups.

2. A process according to claim 1, in which the solid fire retardant additive is selected from melamine, ammonium polyphosphate and guanidine carbonate.

3. A process according to claim 1, characterised in that the isocyanate containing component contains from 10 to 50% by weight of solid fire retardant.

4. A process according to claim 1, characterised in that the liquid isocyanate prepolymer has a free-NCO content between 5 and 12.

5. A process according to claim 1, characterised in that the liquid isocyanate prepolymer comprises a diphenylmethane diisocyanate composition.

6. A process according to claim 1, characterised in that the liquid isocyanate prepolymer is obtained by reacting a diphenyl methane diisocyanate composition with a polyol having an average hydroxyl functionality from 2 to 6 and an average hydroxyl equivalent weight of from 500 to 5000.

7. A fire retardant composition comprising a dispersion of a solid fire retardant in a liquid isocyanate-containing prepolymer composition, characterised in that the liquid isocyanate-containing prepolymer composition has an average isocyanate functionality greater than 2 and an NCO content of from 2 to 15% by weight as obtained by reacting an isocyanate reactive polymer having an average nominal functionality of from 2 to 6, and an average equivalent weight of from about 500 to 5000 with a stoichiometric excess of a diphenylmethane diisocyanate composition containing at least 2% by weight of 2,4'-diphenylmethane diisocyanate and having an average isocyanate functionality in the range from 2 to 2.3

8. A fire retardant composition comprising a dispersion of a solid fire retardant in a liquid isocyanate-containing prepolymer composition, characterised in that the liquid isocyanate-containing prepolymer composition has an average isocyanate functionality greater than 2 and an NCO content of from 2 to 15% by weight obtained by reacting:
   (i) a polyol component comprising at least one polyoxyalkylene polyol containing oxyethylene residues, said polyol component having an average nominal functionality of from 2 to 6, an average hydroxyl equivalent weight of from about 500 to about 5000 and an average oxyethylene content of from 5 to 30% on a weight basis of total oxyalkylene residues, and
   (ii) a stoichiometric excess, relative to the polyol component, of a diphenylmethane diisocyanate composition containing at least 2% by weight of 2,4'-diphenyl-methane diisocyanate on a weight basis of diisocyanate components, and having an average isocyanate functionality in the range from 2 to 2.3.

9. A fire retardant composition comprising a dispersion of a solid fire retardant in a liquid isocyanate-containing prepolymer composition characterised in that the liquid isocyanate containing prepolymer composition is obtained by reacting an isocyanate-reactive polyoxyalkylene polymer with a diphenylmethane diisocyanate containing composition, characterised by
   an average isocyanate functionality of the prepolymer composition greater than 2,
   an —NCO content of the prepolymer composition of from 2 to 12% by weight;
   an oxyethylene content in the isocyanate-reactive polyoxyalkylene polymer in the range from 5 to 30% on a weight basis of total oxyalkylene residues;
   an average nominal functionality of the isocyanate reactive polyoxyalkylene polymer of from 2 to 6;
   a total diphenylmethane diisocyanate content in the diphenylmethane diisocyanate—containing composition of at least 60% by weight;
   a 2,4' diphenylmethane diisocyanate isomer content in the diphenylmethane diisocyanate—containing composition of at least 5%;
   an average isocyanate functionality of the diphenylmethane diisocyanate—containing composition of from 2 to 2.3.

10. A fire retardant composition according to any one of claims 7 to 9, characterised in that the solid fire retardant is selected from melamine, ammonium polyphosphate and guanidine carbonate.

11. A fire retardant composition according to any one of claims 7 to 9 characterised in that the dispersion contains from 10 to 50% by weight of solid fire retardant.

12. A fire retardant composition of claim 7 wherein the liquid isocyanate-containing prepolymer composition has an NCO content of from 2 to 12% by weight and the isocyanate reactive polymer has an average nominal functionality of from 2 to 4.

13. A fire retardant composition of claim 8 wherein the polyol component has an average oxyethylene content of from 10 to 25% on a weight basis of total oxyalkylene residues.

14. A fire retardant composition of claim 9 wherein the average isocyanate functionality of the prepolymer composition is from 2.05 to 2.4, the NCO content of the prepolymer composition is from 5 to 12% by weight and the average isocyanate functionality of the diphenylmethane-diisocyante-containing composition is from 2.1 to 2.3.

* * * * *